United States Patent
Graham

(10) Patent No.: US 12,379,907 B2
(45) Date of Patent: Aug. 5, 2025

(54) GENERATING EXECUTABLES FOR TARGET OPERATIONAL ENVIRONMENTS

(71) Applicant: Hewlett-Packard Development Company, L.P., Spring, TX (US)

(72) Inventor: Christoph Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 129 days.

(21) Appl. No.: 17/997,191

(22) PCT Filed: May 15, 2020

(86) PCT No.: PCT/US2020/033119
§ 371 (c)(1),
(2) Date: Oct. 26, 2022

(87) PCT Pub. No.: WO2021/230879
PCT Pub. Date: Nov. 18, 2021

(65) Prior Publication Data
US 2023/0093197 A1    Mar. 23, 2023

(51) Int. Cl.
*G06F 8/41* (2018.01)
(52) U.S. Cl.
CPC ..................... *G06F 8/41* (2013.01)
(58) Field of Classification Search
USPC ........................................................ 717/140
See application file for complete search history.

(56) References Cited

U.S. PATENT DOCUMENTS

| | | | |
|---|---|---|---|
| 5,577,233 A | 11/1996 | Goettelmann et al. | |
| 7,404,177 B1 | 7/2008 | Greenfield et al. | |
| 8,407,675 B1 | 3/2013 | Clark | |
| 9,690,577 B1 | 6/2017 | Crew et al. | |
| 10,656,940 B1 * | 5/2020 | Hogan | G06F 8/41 |
| 11,847,433 B2 * | 12/2023 | Matousek | G06F 8/34 |
| 2002/0019884 A1 | 2/2002 | Gungabeesoon | |
| 2002/0178290 A1 | 11/2002 | Coulthard et al. | |
| 2004/0068716 A1 * | 4/2004 | Stevens | G06F 8/47 717/140 |
| 2006/0230070 A1 * | 10/2006 | Colton | G06F 8/52 |
| 2013/0326513 A1 | 12/2013 | Shlomai et al. | |

(Continued)

FOREIGN PATENT DOCUMENTS

CN    1189817 C    2/2005

OTHER PUBLICATIONS

Wang et al.; "Reassembleable Disassembling"; 24th USENIX Security Symposium (USENIX Security 15); 2015 (Year: 2015).*

(Continued)

*Primary Examiner* — Bradley A Teets
*Assistant Examiner* — Clint Thatcher
(74) *Attorney, Agent, or Firm* — Quarles & Brady LLP

(57) ABSTRACT

In some examples, a computing device can include a memory resource storing instructions to cause a processor resource to disassemble a compiled executable of a native operational environment into assembly-based instructions, map each assembly-based instruction to a corresponding module of a target operational environment, and generate an executable for the target operational environment using the mapped modules of the target operational environment.

17 Claims, 3 Drawing Sheets

(56) References Cited

U.S. PATENT DOCUMENTS

2015/0277879 A1 10/2015 Gschwind et al.

OTHER PUBLICATIONS

Marco Selvatici; "Webassembly Tutorial"; Github.io website [full URL included in ref.]; 2018 (Year: 2018).*
"Reverse Engineering WebAssembly"; PNF Software blog page at Medium.com [full URL listed in ref.]; 2018 (Year: 2018).*
Kosta Hristov; "Disassembling, Decompiling and Modifying Executables"; Developing the Future (.net) website [Full URL included in ref.]; 2013 (Year: 2013).*
Wang, et al.; "Reassembleable Disassembling"; Proceedings of the 24th USENIX Security Symposium Aug. 12-14, 2015, Washington, D.C. (Year: 2015) Note: Previous copy was provided from author's website, current copy from conference proceedings website.*

\* cited by examiner

GENERATING EXECUTABLES FOR TARGET OPERATIONAL ENVIRONMENTS

BACKGROUND

A computing device can allow a user to utilize computing device operations for work, education, gaming, multimedia, and/or other uses. Computing devices can be utilized in a non-portable setting, such as at a desktop, and/or be portable to allow a user to carry of otherwise bring with the computing device with while in a mobile setting.

DETAILED DESCRIPTION

Figure 1:
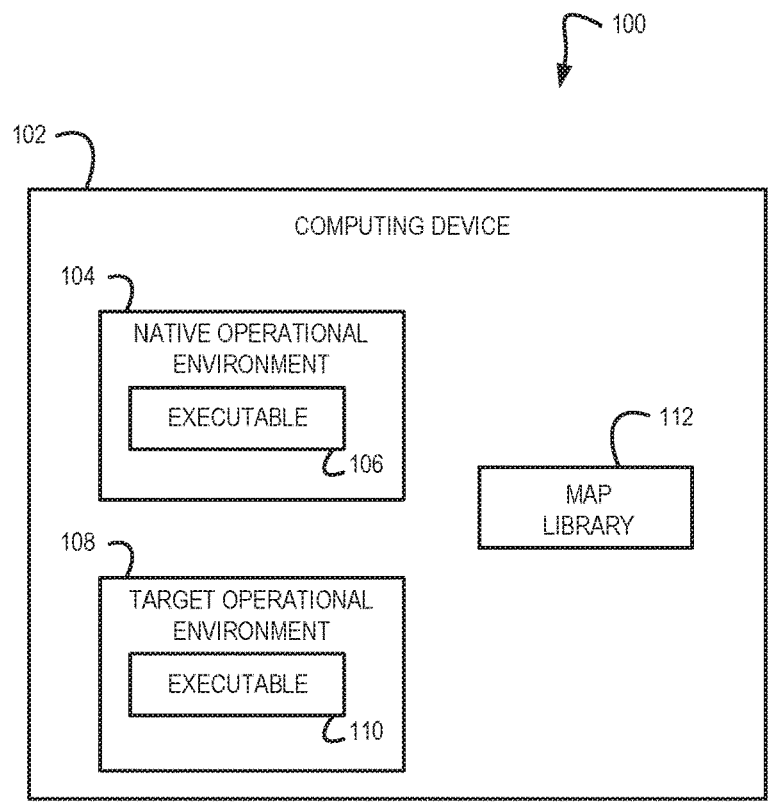
FIG. 1 is an example of a computing device for generating executables for target operational environments.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, networking device (e.g., router, switch, etc.), and/or a mobile device (e.g., a smart phone, tablet, personal digital assistant, smart glasses, a wrist-worn device, etc.), among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

A user may utilize their computing device to execute an executable. As used herein, the term "executable" refers to a collection of instructions that can be executed by a processor resource. An executable can be represented as instructions in a high-level programming language (e.g., which may utilize natural language elements) and/or a low-level programming language (e.g., which may utilize commands or functions that map closely to processor instructions, such as machine code or assembly language).

An executable can be executed by a processor resource to perform a task. For example, the executable can be a word processor, a spreadsheet, a web browser, email client, media player, file viewer, a game, etc. A user may utilize an executable in order to perform a task. For instance, a user may utilize an executable for business, for school, and/or for recreational use, among other examples.

Such executables may execute in an operational environment. As used herein, the term "operational environment" refers to a management executable that manages computing device hardware, computing resources, and/or provides services for other executables. For example, an operational environment can be an operating system (OS). The OS can provide services for executables (e.g., word processor, a spreadsheet, a web browser, email client, media player, file viewer, a game, etc.), manage hardware of the computing device such as a motherboard, power supply, drives (e.g., floppy drives or optical drives such as CD-ROM, CD-RW, DVD-ROM, etc.), hard disk, video card, sound card, peripheral devices (e.g., keyboard, touchpad, mouse, etc.), among other hardware components. An operational environment can manage files and directory creation and deletion, process creation and deletion, synchronization, memory allocation and deallocation, as well as provide other management functions and/or services.

Executables may be programmed to execute in a particular operational environment. As used herein, the term "execute" refers to a process by which a processor resource executes instructions of an executable. For example, a word processor executable may be programmed for a particular operational environment so that the particular operational environment can execute the word processor executable. As operational environments are updated (e.g., by version, updates, patches, etc.), executables may have to be designed and/or updated in order to properly function in such updated operational environments. For example, certain executables may be designed to operate on a cloud computing environment and utilize a web browser for execution, among other examples.

Executables programmed for one operational environment may not function properly in other operational environments or updated operational environments (e.g., updated by version, updates, patches, etc.), as different and/or updated operational environments may handle management functions differently, may provide different types of services to executables, etc. For example, an executable designed for a local operational environment may not function properly in a cloud computing web browser based operational environment, as the cloud computing web browser based operational environment may manage directory creation and deletion differently than a local operational environment. Some users may be hesitant to update or change operational environments as certain executables may not function properly in updated or different operational environments.

Some approaches may include runtime virtualization, OS emulation, remote execution, application streaming, etc. in order to allow executables to properly function in an updated or different operational environment. However, such approaches may be limited in usefulness as coding limitations may prevent proper function. For example, some programming languages may rely on a runtime virtual machine to abstract hardware or other services provided by an operational environment for an executable but may be useful if the executable was originally programmed for that particular operational environment. Additionally, such approaches may come at increased costs as a result of licensing, resource management, and network utilization, which may vary in some examples based on a size of the executable.

Generating executables for target operational environments, according to the disclosure, can allow for generation and execution of an executable from a native operational environment to a target operational environment. Such an approach can allow for execution of legacy executables from legacy (e.g., native) operational environments on a target operational environment in order to provide an easily accessible and functioning executable for a user on the target operational environment. Further, such an approach can allow for migration of an executable from the native operational environment to a target operational environment without having to access the high level language of the executable, such as the source code, or developer resources, as such source code for the executable may no longer exist and/or there may no longer be any active developers for the executable.

FIG. 1 is an example of a computing device 102 for generating executables for target operational environments. The computing device 102 can include executables 106, 110, and map library 112.

As illustrated in FIG. 1, the computing device 102 can include an executable 106. As described above, the executable 106 can be a collection of instructions that can be executed by a processor resource to perform a task. The executable 106 is illustrated in FIG. 1 as being execute in native operational environment 104. That is, the executable 106 can be an executable programmed to execute in the native operational environment 104. As used herein, the term "native operational environment" refers to a type and/or version of an executable that manages computing device hardware, computing resources, and/or provides services for other executables designed for execution in the native operational environment. For example, the native operational environment 104 can be a type or version of an OS that can provide services to allow the executable 106 to operate.

Additionally illustrated in FIG. 1 is executable 110. Executable 110 can be an executable that has been programmed to execute in the target operational environment 108. As used herein, the term "target operational environment" refers to a type and/or version of an executable that manages computing device hardware, computing resources, and/or provides services for other executables designed for execution in the target operational environment. For example, the target operational environment 108 can be a type or version of an OS that is different from the type or version of the native operational environment 104, where the target operational environment 108 can provide services to allow the generated executable 110 to execute.

As described above, executable 106 may be programmed to execute in the native operational environment 104, but may not execute properly in the target operational environment 108, as target operational environment 108 may handle management functions differently than native operational environment 104, may provide different types of services to executables than native operational environment 104, etc., which executable 106 may not be programmed to handle. Accordingly, in order to allow the executable 106 to execute in the target operational environment 108, the executable 106 can be disassembled into assembly-based instructions for one operational environment (e.g., native operational environment 104), mapped to modules for a different operational environment (e.g., target operational environment 108), and generated into executable 110 for operation on target operational environment 108, as is further described herein.

In some examples, the target operational environment 108 can be a WebAssembly operational environment. As used herein, the term "WebAssembly operational environment" refers to an open standard operational environment that defines a portable binary-code format for executables and a corresponding textual assembly language to manage computing device hardware, computing resources, and/or provide services for other executables designed for execution in the WebAssembly operational environment, as well as interfaces for facilitating interactions between such executables and their native operational environment. However, examples of the disclosure are not so limited. For example, the target operational environment 108 can be any other operational environment other than a WebAssembly operational environment.

The computing device 102 can disassemble a compiled executable of a native operational environment 104 into assembly-based instructions. As used herein, the term "compiled executable" refers to an executable having instructions in low-level assembly language, including a machine code format or an assembly language format. For example, executable 106 can be a compiled executable which can be an executable having instructions that can be interpreted and executed by a processor resource.

The executable 106 may be, for instance, an inventory tracking executable. The inventory tracking executable may execute properly in the native operational environment 104. While the inventory tracking executable may properly execute in the native operational environment 104, updates and/or different versions may have been released (e.g., for quality of life issues, security updates, etc.). For example, the target operational environment 108 may be a newer and/or more up to date version of the native operational environment 104, may be a different operational environment, etc. Such updating of the native operational environment 104 may cause the executable 106 to execute improperly, or not at all. For example, the management functions and/or services of native operational environment 104, which the executable 106 may rely on, may change as a result of an update, resulting in the executable 106 executing improperly. For instance, an update to the native operational environment 104 may directory creation and deletion methods to change, resulting in the executable 106 executing improperly, as the executable 106 was not programmed to execute with the updated directory creation and deletion methods of the updated native operational environment 106.

While the native operational environment 106 may be updated, a user may still wish to utilize the inventory tracking executable. As new or updated versions of the native operational environment 106 are anticipated, a user may hope for compatibility of the executable 106 with the new or updated versions of the native operational environment 106, but such compatibility may not always occur. While the user may attempt to contact the developer of the executable 106 to update the version of the executable 106 to be compatible with the updated native operational environment 106, in some examples source code for the executable 106 may no longer exist, the developer may no longer support the executable 106, and/or the developer of the executable 106 may no longer be active. Approaches described herein can allow the executable 106 to be disassembled such that an executable 110 can be generated for use in the target operational environment 108, allowing the user to utilize the tasks provided by executable 106 in the target operational environment 108 via executable 110, as is further described herein.

Although the executable 106 is described above as being an inventory tracking executable, examples of the disclosure are not so limited. For example, the executable 106 can be a word processor, a spreadsheet, a web browser, email client, media player, file viewer, a game, and/or any other executable.

The compiled executable 106 can be disassembled into assembly-based instructions. As used herein, the term "disassemble" refers to translation of machine-based instructions into assembly language. As used herein, the term "assembly-based instructions" refers to low-level assembly language having a correlation between instructions in the assembly language and underlying machine-based instructions. For example, the executable 106 can be disassembled into a low-level assembly-based instructions that can be parsed by a processor resource of the computing device 102. The disassembled assembly-based instructions can represent control blocks, instruction flow, and/or branching of the compiled executable 106. The disassembled assembly-based instructions can include programming constructs such as loops, conditions, branching, functions, and modules, among other types of programming constructs.

Disassembly of the compiled executable 106 can include disassembling statically linked modules included in the compiled executable 106. As used herein, the term "module" refers to an instruction of an executable that includes one routine or more than one routine. For example, the compiled executable 106 can include routine(s) that when execute cause a task to be performed. As used herein, the term "statically linked module" refers to a module in which contents are included at the time the module is linked to an executable. For example, statically linked modules can be included at the time the module is linked to the executable 106. Statically linked modules can include library calls, among other types of statically linked modules. For instance, a library call included in the compiled executable 106 can be disassembled by the computing device 102.

Disassembly of the compiled executable 106 can include disassembling dynamically linked modules included in the compiled executable 106. Disassembly of dynamically linked modules can include disassembly of pointers associated with the dynamically linked modules. As used herein, the term "dynamically linked module" refers to a module in which a pointer to contents being linked is included in the executable, but not the contents itself. As used herein, the term "pointer" refers to a virtual data structure that stores a memory address. For example, the compiled executable 106 can include a dynamically linked module having a pointer (e.g., such as a file name), and the dynamically linked module can include the file in the executable during runtime of the executable. Such a dynamically linked module, including the pointer, can be disassembled by the computing device 102.

In some examples, the computing device 102 can generate a library of modules (e.g., not illustrated in FIG. 1) which can be interchanged with a dynamically linked module in the compiled executable 106. For instance, in response to the computing device 102 recognizing a function identifier in a dynamically linked module, the computing device 102 can replace the function identifier with a module that reconstitutes the function associated with the function identifier for the target operational environment 106. For example, the computing device 102 can determine a dynamically linked module includes a DrawText( ) function for the native operational environment 104, and the computing device 102 can replace the DrawText( ) function for the native operational environment 104 with a DrawText( ) function for the target operational environment 108 included in the library of modules.

In some examples, the computing device 102 can generate a syntax tree according to the assembly-based instructions of the disassembled executable 106. As used herein, the term "syntax tree" refers to a tree representation of the syntax structure of source code written in a programming language. For example, the computing device 102 can parse the disassembled assembly-based instructions of the disassembled executable 106 to generate the syntax tree. The syntax tree can provide a representation of the instructions (e.g., the source code) of the executable 106, including the order of execution of the executable 106. The syntax tree can illustrate where potential machine-level code jumps in the instructions occur (e.g., jumps in code), where branching of the instructions may occur (e.g., "if" statements, function calls, loops, among other examples), etc.

As illustrated in FIG. 1, the computing device 102 can include a map library 112. As used herein, the term "map library" refers to a library of modules, where each module includes a routine or series of routines that perform an action. For example, the map library 112 can include a module including instructions to perform a call to an application programming interface (API), among other examples of actions performed by a routine or series of routines.

Each module included in the map library 112 can comprise low-level virtual machine (LLVM) assembly instructions for use with a WebAssembly operational environment. However, examples of the disclosure are not so limited. For example, each module included in the map library 112 can include any other type of assembly instructions.

The computing device 102 can map each assembly-based instruction (e.g., disassembled from the executable 106) to a corresponding module of the target operational environment 108 included in the map library 112. For example, the assembly-based instructions disassembled from the executable 106 can include an API call written in x86 instructions. The computing device 102 can map the API call written in x86 instructions to a corresponding module written in LLVM for WebAssembly included in the map library 112 to perform the API call.

The computing device 102 can map each assembly-based instruction to a corresponding WebAssembly module. For example, each assembly-based instruction from the executable 106 can map to a WebAssembly module included in the map library 112. In such an example, the computing device 102 can map each assembly-based instruction to a WebAssembly module without the use of a syntax tree. The WebAssembly modules can be arranged in the same execution order as the assembly-based instructions from the executable 106 without the use of a syntax tree. In some examples, the computing device 102 can map each assembly-based instruction to a WebAssembly module and arrange the WebAssembly modules in the same order as the assembly-based instructions from the executable 106 with the use of the syntax tree. However, in some examples the WebAssembly modules may not be able to be arranged in the same execution order as the assembly-based instructions from the executable 106, as is further described herein.

In some examples, the computing device 102 can map each assembly-based instruction to a corresponding WebAssembly module according to the generated syntax tree. For instance, in an example in which WebAssembly modules may be rearranged from the execution order of the assembly-based instructions from the executable 106, and/or in an example in which new WebAssembly modules may be generated (e.g., generated WebAssembly modules to emulate an assembly-based instruction, multiple WebAssembly modules to emulate an assembly-based instruction, etc.), the computing device 102 can utilize the generated syntax tree. For example, each assembly-based instruction can be mapped to a WebAssembly module (e.g., in response to the WebAssembly module being included in the map library 112) and arranged in a particular order utilizing the syntax tree to ensure the correct order of execution of each of the mapped WebAssembly modules such that when the executable 110 is generated, compiled, and execute (e.g., as is further described herein), the executable 110 can emulate the tasks provided by the executable 106, as is further described herein.

The computing device 102 can map each assembly-based instruction to the corresponding module by identifying functions in the syntax tree that map to modules included in the map library 112. For example, the computing device 102 can map each of the statically linked modules to a respective module included in the map library 112 and map each of the dynamically linked modules to a respective module included in the map library 112.

For example, the computing device 102 can identify an API call and map the API call to a module included in the map library 112 that performs the API call. As another example, the computing device 102 can identify operational environment services and map the operational environment services to a module included in the map library 112 that mimics the operational environment services.

In examples in which a syntax tree is utilized, such modules can be appended to a new syntax tree. The new syntax tree can be a tree representation of the syntax structure of source code that is a representation of the modules (e.g., WebAssembly modules) from the map library 112 that correspond to the assembly-based instructions of the disassembled executable 106. Similar to the syntax tree for the disassembled executable 106, the new syntax tree can illustrate where potential jumps in the instructions occur (e.g., jumps in code), where branching of the instructions may occur (e.g., "if" statements, function calls, loops, among other examples), etc.

As described above, the computing device 102 can map each assembly-based instruction to a corresponding module in response to the corresponding module being included in the map library 112. However, examples of the disclosure are not so limited. For example, in some instances, a module may not be included in the map library 112 that corresponds to an assembly-based instruction from the disassembled executable 106.

In such an example, the computing device 102 can generate a module that corresponds to an assembly-based instruction from the disassembled executable 106. For example, a disassembled dynamically linked module from the disassembled executable 106 may include a pointer for which no corresponding module exists in the map library 112. The computing device 102 can generate a module (e.g., a WebAssembly module) which corresponds to the pointer.

In some examples, the computing device 102 can line-by-line generate a module corresponding to an assembly-based instruction. For example, the disassembled executable 106 may include a file system API which does not have a corresponding WebAssembly module in the map library 112. The computing device 102 can generate a WebAssembly module that would emulate the file system API call which can, in some examples, utilize components of the target operational environment 108 (e.g., an internal cache of a web browser).

In some examples, the computing device 102 can generate more than one module to emulate an assembly-based instruction. For example, the disassembled executable 106 may include a matrix math function. In some examples, the map library 112 (e.g., LLVM) may not include matrix math functionality. Accordingly, the computing device 102 can generate multiple WebAssembly modules to emulate the matrix math functionality.

Such generated modules can be saved in the map library 112. For example, a future executable (e.g., not illustrated in FIG. 1) may be disassembled that may include a matrix math function, and the map library 112 can utilize the multiple WebAssembly modules to emulate the matrix math functionality of the future executable.

The computing device 102 can generate an executable 110 for the target operational environment 108 using the mapped modules. For example, utilizing the mapped modules (e.g., and the new syntax tree), the computing device 102 can generate the executable 110 such that the executable 110 can execute in the target operational environment 108 while emulating the executable 106 as it would operate in the native operational environment 104. For example, an inventory tracking executable which may not have execute as an executable 106 in the target operational environment can be generated as an executable 110 for use in the target operational environment 108.

The computing device 102 can compile the generated executable 110. As used herein, the term "compile" refers to translation of high-level assembly language into low-level assembly language. For example, the computing device 102 can compile the generated executable 110 into low-level assembly language including a machine code format or an assembly language format for interpretation and execution by a processor resource.

The computing device 102 can distribute the generated and compiled executable 110 via a uniform resource locator (URL). As used herein, the term "URL" refers to a reference to a web resource that specifies a location of the web resource on a computer network and a mechanism for retrieving the web resource. For example, the URL can specify the location of the executable 110 and a mechanism for retrieving and executing the web resource.

The executable 110 can be executed by a web browser. As used herein, the term "web browser" refers to an executable for accessing information on the World Wide Web. For example, the executable 110 can be retrieved and executed by a web browser. Utilizing a web browser (e.g., the target operational environment 108) to execute the executable 110 can provide security through sandboxing. As used herein, the term "sandboxing" refers to isolation of executables from system resources and/or other executables. For example, the web browser can be sandboxed from an OS of the computing device 102, and/or executables execute within the web browser can be sandboxed from each other.

Generating executables for target operational environments, according to the disclosure, can allow for continued use of executables, such as legacy executables which may be designed for a native operational environment, within the context of a target operational environment, allowing users to ability to choose different computing device types, operating systems, etc. without complex and/or expensive licensing, virtualization, etc. to continue to execute legacy executables. Additionally, generating executables for target operational environments can provide for security utilizing sandboxing techniques to prevent executables which may include malware or other security risk executables from modifying the underlying operational environment. Further, use of a web browser operational environment can allow executables to be deployed and executed in a web-centric model so that users do not have to install executables and/or their supporting components locally on their computing devices.

Figure 2:
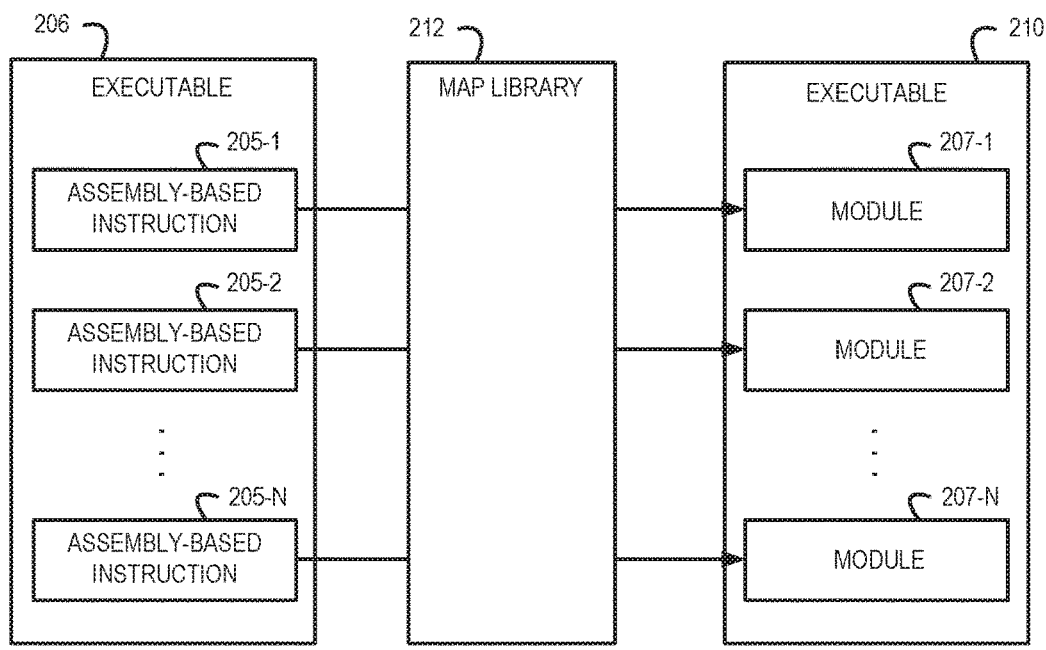
FIG. 2 illustrates an example of assembly-based instructions mapped to corresponding modules.

FIG. 2 illustrates an example of assembly-based instructions 205 mapped to corresponding modules 207. As illustrated in FIG. 2, the executable 206 can include assembly-based instructions 205 and the executable 210 can include modules 207.

As illustrated in FIG. 2, a computing device (e.g., computing device 102, previously described in connection with FIG. 1) can map each assembly based instruction 205-1, 205-2, 205-N disassembled from the executable 206 to a corresponding module 207-1, 207-2, 207-N from the map library 212. For example, assembly-based instruction 205-1 can be an API call in x86 instructions for the native operational environment for executable 206. The computing device can map the x86 instruction API call of the assembly-based instruction 205-1 to a WebAssembly module 207-1 for the target operational environment for executable 210 from the map library, where the WebAssembly module 207-1 can perform the API call.

The computing device can repeat this procedure to map each assembly-based instruction 205-1, 205-2, 205-N to a corresponding module 207-1, 207-2, 207-N from the map library 212. The computing device can map each assembly-based instruction 205-1, 205-2, 205-N to the corresponding modules 207-1, 207-2, 207-N by identifying functions in the syntax tree that map to the modules 207-1, 207-2, 207-N, as previously described in connection with FIG. 1. In an example in which a module is not included in the map library 212 that maps to an assembly-based instruction, the computing device can generate a module that corresponds to an assembly-based instruction, as previously described in connection with FIG. 1.

Figure 3:
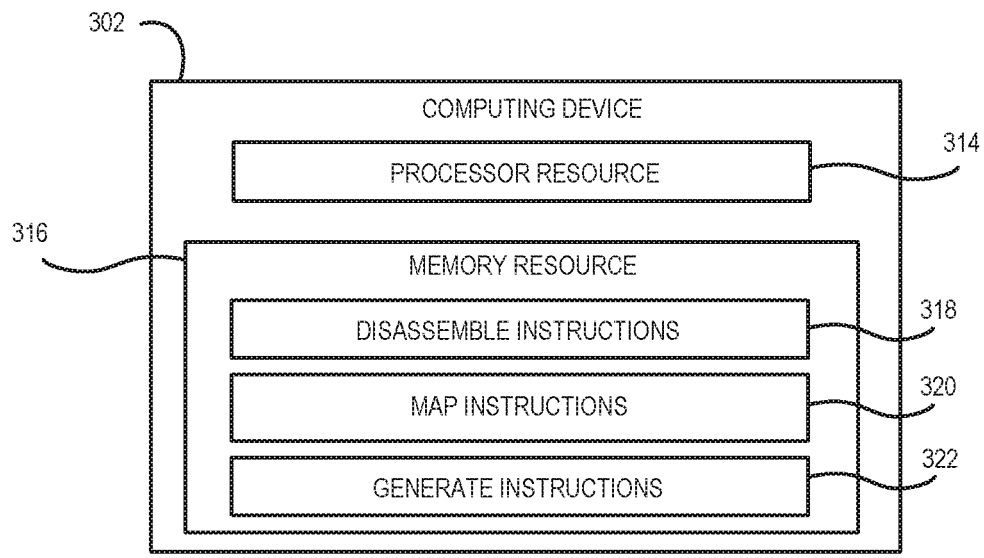
FIG. 3 illustrates an example of a computing device for generating executables for target operational environments.

FIG. 3 illustrates an example of a computing device 302 for generating executables for target operational environments. As described herein, the computing device 302 may perform functions related to generating executables for target operational environments. Although not illustrated in FIG. 3, the computing device 302 may include a processor and a non-transitory machine-readable storage medium. Although the following descriptions refer to a single processor and a single machine-readable storage medium, the descriptions may also apply to a system with multiple processors and multiple machine-readable storage mediums. In such examples, the computing device 302 may be distributed across multiple non-transitory machine-readable storage mediums and across multiple processors. Put another way, the instructions executed by the computing device 202 may be stored across multiple machine-readable storage mediums and executed across multiple processors, such as in a distributed or virtual computing environment.

Processor resource 314 may be a central processing unit (CPU), a semiconductor-based microprocessor, and/or other hardware devices suitable for retrieval and execution of machine-readable instructions 318, 320, 322 stored in a memory resource 316. Processor resource 314 may fetch, decode, and execute instructions 318, 320, 322. As an alternative or in addition to retrieving and executing instructions 318, 320, 322, processor resource 314 may include a plurality of electronic circuits that include electronic components for performing the functionality of instructions 318, 320, 322.

Memory resource 316 may be any electronic, magnetic, optical, or other physical storage device that stores executable instructions 318, 320, 322 and/or data. Thus, memory resource 316 may be, for example, Random Access Memory (RAM), an Electrically-Erasable Programmable Read-Only Memory (EEPROM), a storage drive, an optical disc, and the like. Memory resource 316 may be disposed within computing device 302, as shown in FIG. 3. Additionally, memory resource 316 may be a portable, external or remote storage medium, for example, that causes computing device 302 to download the instructions 318, 320, 322 from the portable/external/remote storage medium.

The computing device 302 may include instructions 318 stored in the memory resource 316 and executable by the processor resource 314 to disassemble a compiled executable of a native operational environment into assembly-based instructions. Disassembly of the compiled executable can include disassembling statically linked modules and/or dynamically linked modules included in the compiled executable.

The computing device 302 may include instructions 320 stored in the memory resource 316 and executable by the processor resource 314 to map each assembly-based instruction to a corresponding module of a target operational environment. For example, if the corresponding module is included in a map library, the computing device 302 can map it to a corresponding disassembled assembly-based instruction.

The computing device 302 may include instructions 322 stored in the memory resource 316 and executable by the processor resource 314 to generate an executable for the target operational environment using the mapped modules. For example, the computing device 302 can generate an executable for a target operational environment that can emulate the disassembled executable from the native operational environment.

Figure 4:
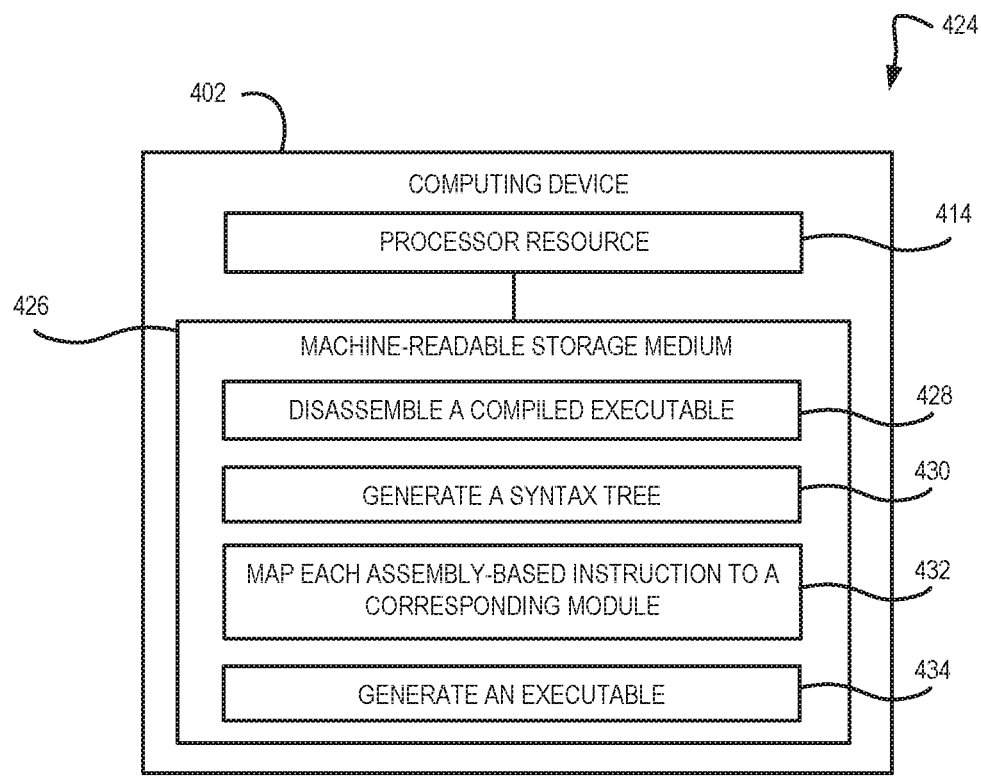
FIG. 4 illustrates a block diagram of an example system for generating executables for target operational environments.

FIG. 4 illustrates a block diagram of an example system 424 for generating executables for target operational environments. In the example of FIG. 4, system 424 includes a computing device 402 having a processor resource 414 and a non-transitory machine-readable storage medium 426. Although the following descriptions refer to a single processor resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor resource 414 may be a central processing unit (CPU), microprocessor, and/or other hardware device suitable for retrieval and execution of instructions stored in machine-readable storage medium 426. In the particular example shown in FIG. 4, processor resource 414 may receive, determine, and send instructions 428, 430, 432, and 434. As an alternative or in addition to retrieving and executing instructions, processor resource 414 may include an electronic circuit comprising a number of electronic components for performing the operations of the instructions in machine-readable storage medium 426. With respect to the executable instruction representations or boxes described and shown herein, it should be understood that part or all of the executable instructions and/or electronic circuits included within one box may be included in a different box shown in the figures or in a different box not shown.

Machine-readable storage medium 426 may be any electronic, magnetic, optical, or other physical storage device that stores executable instructions. Thus, machine-readable storage medium 426 may be, for example, Random Access Memory (RAM), an Electrically-Erasable Programmable Read-Only Memory (EEPROM), a storage drive, an optical disc, and the like. The executable instructions may be "installed" on the system 424 illustrated in FIG. 4. Machine-readable storage medium 426 may be a portable, external or remote storage medium, for example, that allows the system 424 to download the instructions from the portable/external/remote storage medium. In this situation, the executable instructions may be part of an "installation package".

Disassemble a compiled executable instructions 428, when executed by a processor such as processor resource 414, may cause system 424 to disassemble a compiled executable of a native operational environment into assembly-based instructions. Disassembly of the compiled executable can include disassembling statically linked modules and/or dynamically linked modules included in the compiled executable.

Generate a syntax tree instructions 430, when executed by a processor such as processor resource 414, may cause system 424 to generate a syntax tree according to the assembly-based instructions of the disassembled executable. The syntax tree can provide a representation of the instructions (e.g., the source code) of the disassembled executable, including the order of execution of the disassembled executable, illustrate where potential jumps in the instructions occur (e.g., jumps in code), where branching of the instructions may occur (e.g., "if" statements, function calls, loops, among other examples), etc.

Map each assembly-based instruction to a corresponding module instructions 432, when executed by a processor such as processor resource 414, may cause system 424 to map each assembly-based instruction to a corresponding module of a target operational environment according to the syntax tree. For example, if the corresponding module is included in a map library, the computing device 402 can map it to a corresponding disassembled assembly-based instruction. In an example in which the corresponding module is not included in the map library, the computing device 402 can generate a module that corresponds to the assembly-based instruction.

Generate an executable instructions 434, when executed by a processor such as processor resource 414, may cause system 424 to generate an executable for the target operational environment using the mapped modules. For example, the processor resource 414 can generate an executable for a target operational environment that can emulate the disassembled executable from the native operational environment using the mapped modules of the target operational environment.

Figure 5:
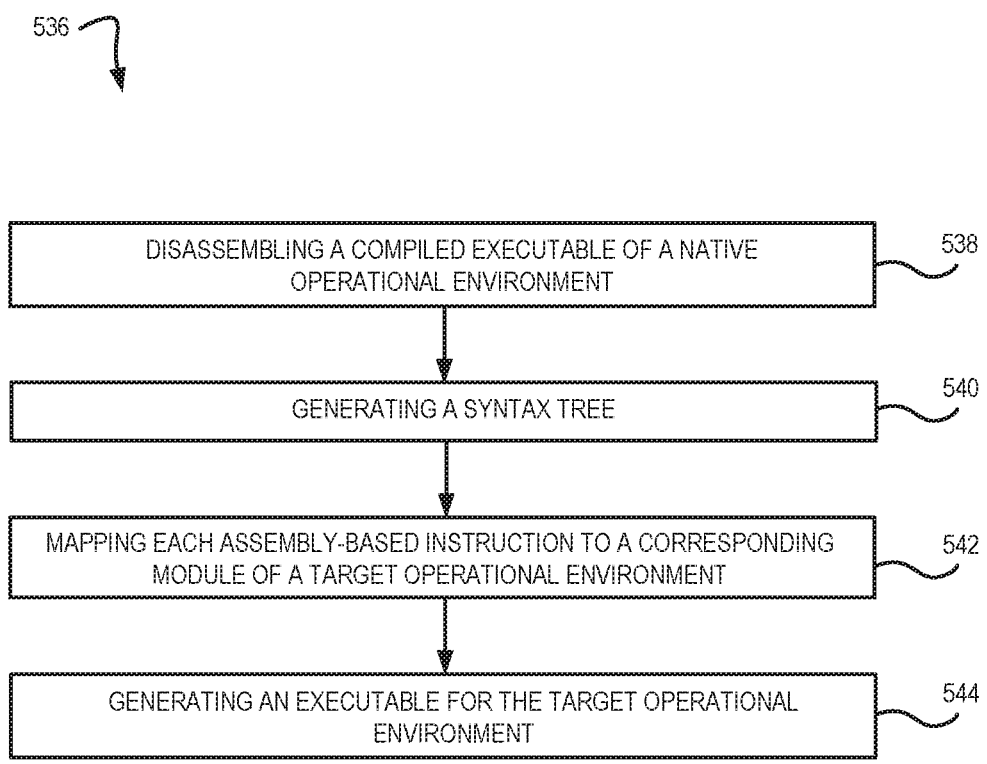
FIG. 5 illustrates an example of a method for generating executables for target operational environments.

FIG. 5 illustrates an example of a method 536 for generating executables for target operational environments. For example, method 536 can be performed by a computing device (e.g., computing device 102, 302, 402, previously described in connection with FIGS. 1, 3, and 4, respectively).

At 538, the method 536 includes disassembling, by a computing device, a compiled executable of a native operational environment into assembly-based instructions. For example, the computing device can disassemble statically linked modules and/or dynamically linked modules included in the compiled executable. In some examples, disassembly of the dynamically linked modules can include disassembly of pointers associated with dynamically linked modules.

At 540, the method 536 includes generating, by the computing device, a syntax tree according to the assembly-based instructions of the disassembled executable. The syntax tree can provide a representation of the instructions (e.g., the source code) of the disassembled executable, including the order of execution of the disassembled executable, illustrate where potential jumps in the instructions occur (e.g., jumps in code), where branching of the instructions may occur (e.g., "if" statements, function calls, loops, among other examples), etc.

At 542, the method 536 includes mapping, by the computing device, each assembly-based instruction to a corresponding module of a target operational environment according to the syntax tree. For example, if the corresponding module is included in a map library, the computing device can map it to a corresponding disassembled assembly-based instruction. In an example in which the corresponding module is not included in the map library, the computing device can generate a module that corresponds to the assembly-based instruction.

At 544, the method 536 includes generating, by the computing device, an executable for the target operational environment using the mapped modules. For example, the computing device can generate an executable for a target operational environment that can emulate the disassembled executable from the native operational environment.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

What is claimed is:

1. A computing device comprising: a processor resource including a plurality of electronic circuits; and a non-transitory memory resource storing machine-readable instructions stored thereon that, when executed, cause the processor resource to: disassemble a compiled executable of a native operational environment into assembly-based instructions, the processor resource is to generate a syntax tree from the assembly-based instructions, map, in accordance with the syntax tree, the assembly-based instructions to a corresponding module of a target operational environment that differs from the native operational environment in type or version, and generate, in response to mapping the assembly-based instructions to the corresponding module, an executable for the target operational environment.

2. The computing device of claim 1, wherein the processor resource is to map the assembly-based instructions in response to an existence of the corresponding module in a map library.

3. The computing device of claim 2, wherein the computing device is to generate, in an absence of the corresponding module in the map library, one or more modules that correspond to the assembly-based instruction.

4. The computing device of claim 3, wherein the computing device is to save the one or more modules in the map library.

5. The computing device of claim 2, wherein modules included in the map library comprise low-level virtual machine assembly instructions.

6. The computing device of claim 2, wherein the processor resource is to:
map a dynamically linked module to a respective module in the map library.

7. The computing device of claim 6, wherein the processor resource is to:
generate, in response to an absence of a module for a pointer in the dynamically linked module, the module for the pointer.

8. The computing device of claim 6, wherein disassembling the dynamically linked module comprises disassembling pointers associated with the dynamically linked module.

9. The computing device of claim 2, wherein the processor resource is to:
map each assembly-based instruction to the corresponding module by identifying functions in the syntax tree that map operational environment services.

10. The computing device of claim 2, wherein the processor resource is to:
map each assembly-based instruction to the corresponding module by identifying functions in the syntax tree that map an application programming interface call.

11. The computing device of claim 10, wherein the processor resource is to:
append a first module corresponding to the application programming interface call from the map library to a new syntax tree.

12. The computing device of claim 11, wherein the processor resource is to:
append a second module corresponding to operational environment services to the new syntax tree.

13. The computing device of claim 2, wherein the processor resource is to disassemble the compiled executable by disassembling statically linked modules included in the compiled executable.

14. The computing device of claim 13, wherein the processor resource is to map each of the statically linked modules to a respective module included in the map library.

15. The computing device of claim 1, wherein the compiled executable is executable by the processor resource.

16. A non-transitory memory resource storing machine-readable instructions stored thereon that, when executed, cause a processor resource to: disassemble a compiled executable of a native operational environment into assembly-based instructions, the processor resource is to generate a syntax tree from the assembly-based instructions; map, in accordance with the syntax tree, the assembly-based instructions to a corresponding module of a target operational environment that differs from the native operational environment in type or version; and generate, in response to mapping the assembly-based instructions to the corresponding module, an executable for the target operational environment.

17. A method, comprising: disassembling, by a computing device, a compiled executable of a native operational environment into assembly-based instructions, a processor resource is to generate a syntax tree from the assembly-based instructions, mapping, by the computing device in accordance with the syntax tree, the assembly-based instructions to a corresponding module of a target operational environment that differs from the native operational environment in type or version, and generating, by the computing device in response to mapping the assembly-based instructions to the corresponding module, an executable for the target operational environment.

* * * * *